June 17, 1958  W. C. HILL, JR., ET AL  2,838,920
SHEAR PIN ASSEMBLY
Filed April 9, 1957  3 Sheets-Sheet 1

INVENTORS
WALTER C. HILL, JR.
HARDY W. SMITH
WINFIELD C. TWITCHELL
BY Harry J. McCauley
ATTORNEY June 17, 1958  W. C. HILL, JR., ET AL  2,838,920
SHEAR PIN ASSEMBLY
Filed April 9, 1957  3 Sheets-Sheet 2

INVENTORS
WALTER C. HILL, JR.
HARDY W. SMITH
WINFIELD C. TWITCHELL
BY Harry J. McCauley
ATTORNEY June 17, 1958  W. C. HILL, JR., ET AL  2,838,920
SHEAR PIN ASSEMBLY
Filed April 9, 1957  3 Sheets-Sheet 3

INVENTORS
WALTER C. HILL, JR.
HARDY W. SMITH
WINFIELD C. TWITCHELL
BY Harry J. McCauley
ATTORNEY United States Patent Office 2,838,920
Patented June 17, 1958

2,838,920

SHEAR PIN ASSEMBLY

Walter C. Hill, Jr., Wilmington, Hardy W. Smith, Claymont, and Winfield C. Twitchell, Wilmington, Del., assignors to E. I. du Pont de Nemours and Company, Wilmington, Del., a corporation of Delaware Application April 9, 1957, Serial No. 651,703

3 Claims. (Cl. 64—28)

This invention relates to a shear pin assembly for power transmissions, and particularly to a shear pin assembly wherein the severed ends of the broken pin are removed from position adjacent one another immediately after the pin is sheared, so that the shearing stress of the pin is accurately reproducible and there is a reduced tendency for the power input member of the coupling to drag on the power output member of the coupling after shear pin breakage.

It is the customary practice in power transmissions to provide shear pins or equivalent constructions between the power source and the driven mechanism in order that sudden changes in velocity caused by jamming, the presence of tramp iron or the sudden breakage of one of the machine elements, does not impose destructive loads on the transmission or the power source, but instead breaks the shear pin or other safety device, which can be thereafter economically replaced after the cause of the breakage has been corrected. It is often desirable that the shear pin break at a precise load level, and that there be no tendency to transmit power across the broken shear pin due to drag between the broken ends, or from other cause.

Figure 1:
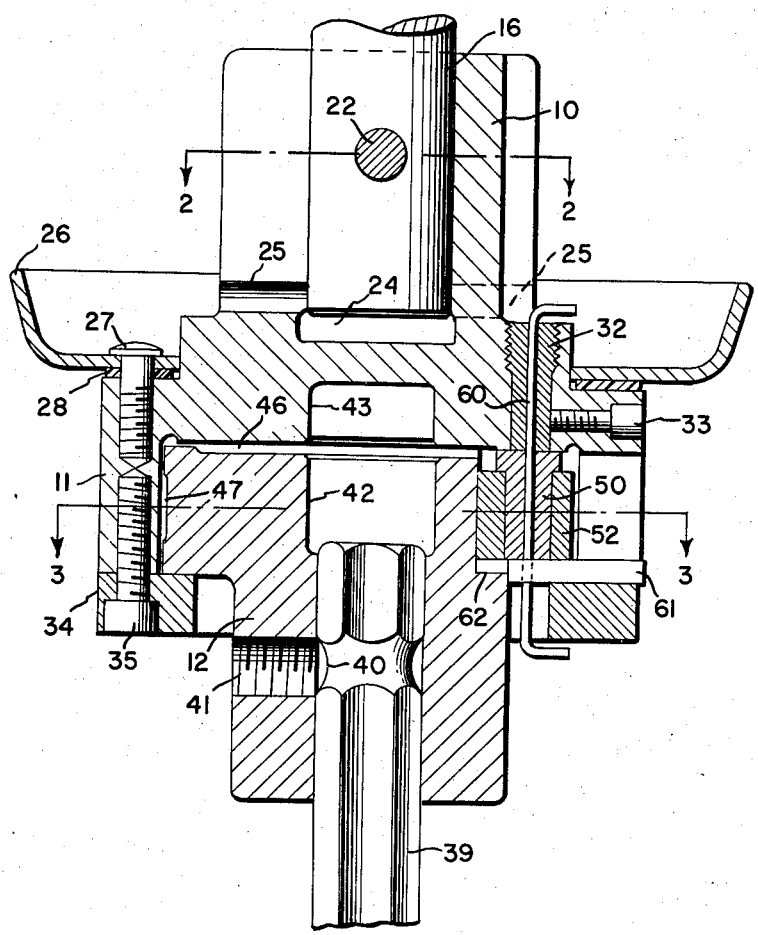
Figure 3:
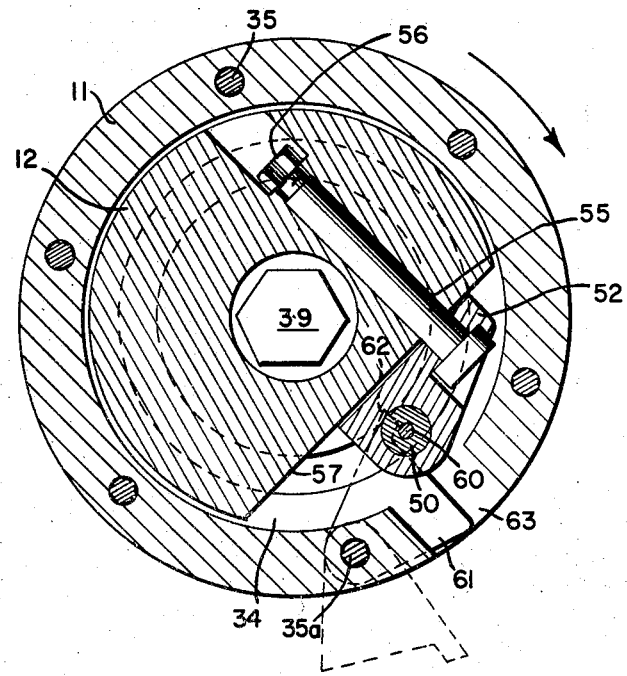
Figure 2:
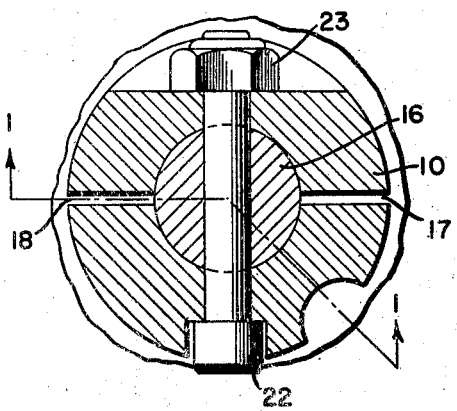
Figure 4:
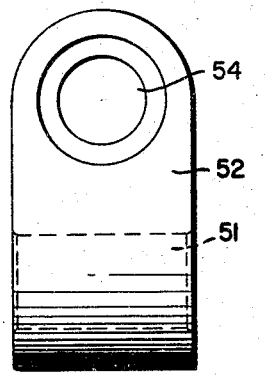
Figure 5:
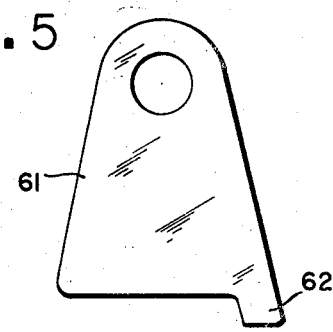
Figure 7:
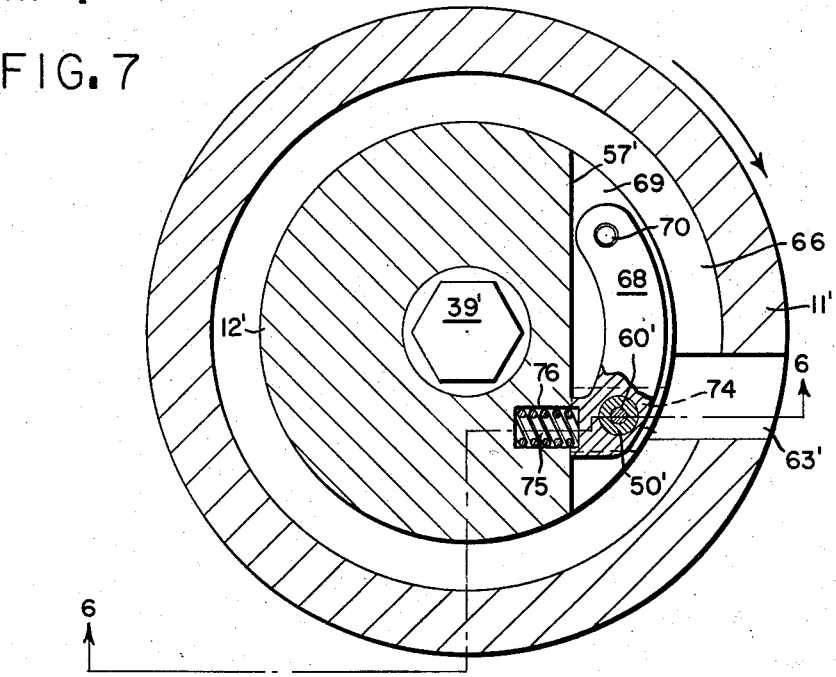
Figure 6:
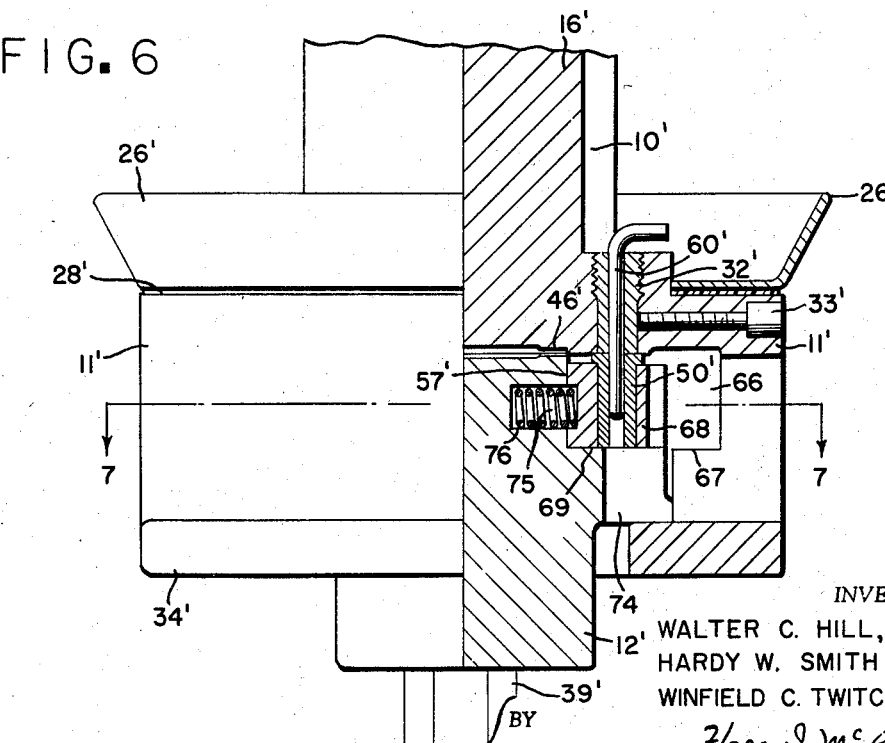

It is an object of this invention to provide a shear pin assembly which is adapted to break the power connection through the transmission at a very precise load level with accompanying physical separation of the broken shear pin ends. Other objects of this invention include the provision of a shear pin assembly which is economical to fabricate and in which shear pins can be readily replaced to permit restoration of service. The manner in which these and other objects of this invention is attained will become apparent from the following description and the drawings, in which:

Fig. 1 is a side elevation view in section of a preferred embodiment of this invention, the coupling end connecting with drive shaft 16 being shown in section along line 1—1, Fig. 2, and supporting key 61 being shown in full, Fig. 2 is a partial sectional view on line 2—2 of Fig. 1, Fig. 3 is a sectional view on line 3—3 of Fig. 1, Fig. 4 is a side elevation view of the lower bushing holder for the apparatus of Fig. 1, Fig. 5 is a plan view of the key element retaining the lower bushing holder in position, Fig. 6 is a side elevation view in section on line 6—6 of Fig. 7, of a second embodiment of this invention, and Fig. 7 is a sectional view in plan taken generally on line 7—7 of Fig. 6.

Generally, the apparatus of this invention comprises a coupling provided with a shear pin which is supported as regards at least one element of the coupling in a manner such that the ends of the severed shear pin are positively separated one from another immediately following the shearing of the pin, so that power transmission through the coupling is terminated completely.

Referring to Fig. 1, the power input member of the coupling is indicated at 10 which, as shown, includes a skirt portion 11 within which is received the power output member 12 of the coupling. It will be assumed in the following description of the embodiment of Figs. 1–5 that the longitudinal axis of the coupling is vertically disposed, making it possible to utilize gravitational force for the separation of the severed shear pin ends, although it will be understood that this invention is not limited to this particular construction, as will be hereinafter brought out.

Power is delivered to the coupling through rotating shaft 16 which may be the output shaft of a motor, speed reducer or other source of power. The connection of shaft 16 with power input member 10 can be through a driving key or other means; however, the bolted construction detailed in Figs. 1 and 2 is particularly preferred. In this design, member 10 is drilled axially to receive the end of shaft 16, member 10 being split diametrically for a portion of the length as indicated at 17 and 18 to give radial freedom in the attachment of shaft 16 with 10. This shaft is provided with a diametrical hole adapted to receive bolt 22 which clamps the two split portions of 10 to shaft 16 by nut 23. The passage in member 10 receiving shaft 16 is preferably undercut at 24, which furnishes free space for the reception of any oil or other lubricant which may work down the shaft in the course of operation. Power input member 10 is also preferably drilled radially at opposite points 25 to provide lubricant discharge passages opening into 24 communicating with catch pan 26, which is adapted to also receive any lubricant which may escape from the drive source externally of member 10. Pan 26 is secured to 10 by machine screws 27, which engage with tapped holes in the member body, and leakage from the pan is prevented by gasket 28 interposed between the pan and the member body.

The base of member 10 is tapped to receive upper shear pin bushing 32, which is threaded over a portion of its upper length to permit attachment to power input member 10. The upper end of bushing 32 is preferably provided with a screw driver slot, not shown, to facilitate adjustment of the bushing axially of the coupling and precise location of the bushing is retained by set screw 33, which is tightened down when the bushing is adjusted to the desired degree as hereinafter described. The coupling assembly is completed by retaining ring 34 attached to skirt 11 by bolts 35, ring 34 supporting the weight of power output member 12 from driving member 10.

As shown in Figs. 1 and 3, power output member 12 is machined axially with mating cross section to receive power output shaft 39, which is represented as having an hexagonal exterior configuration. The upper end of shaft 39 is necked down at 40 to receive a set screw engaging with tapped hole 41, to prevent dropout of shaft 39 if support is removed at any point farther along in the transmission. The upper end of member 12 is drilled out axially at 42, as is the underside of member 10 at 43, to permit some axial movement of shaft 39 to facilitate connection with subsequent elements in the power transmission train not shown.

The upper side of member 12 is undercut at 46 to reduce the surface in contact between the driving and driven coupling elements, as is also the circumference of member 12 at 47, thereby reducing drag tending to transmit power through the coupling even after the shear pin is broken.

Referring especially to Figs. 1, 3, 4, and 5, member 12 is provided with lower shear pin bushing 50 which is press-fitted into a passage 51 in pivotally supported bushing holder 52. The underside of the head of bushing 50 is finished to a plane surface matching with the upper surface of holder 52, which is conveniently accomplished by grinding, slight undercutting radially being not objectionable. Bushing holder 52 is attached to member 12 by a shoulder screw 55 inserted through drilled hole 54, screw 55 being shouldered at the threaded end engaged with nut 56 so that the head is disposed at a clearance with respect to flat surface 57 so that bushing holder 52 is free at all times to rotate about the axis of bolt 55.

As seen in Fig. 1 particularly, shear pin 60, which may be a circular cross section steel wire, such as drill rod steel SAE 1095, untreated, having a diameter of 0.0300″–0.1030″, is supported at the upper end in bushing 32 and, at the lower end, in bushing 50. In assembled condition with shear pin 60 intact, the upper face of bushing 50 is brought opposite to and closely adjacent with the lower face of bushing 32, and this disposition is maintained by blocking bushing holder 52 in its upper position by key 61, which is pivotally attached to the underside of skirt 11 by bolt 35a (refer Fig. 3). As shown particularly in Fig. 5, the base of key 61 is provided with an integral dog 62 which, in service, is positioned in back of shear pin 60 so as to prevent centrifugal throwout of key 61 during rotation of the coupling, all as hereinafter described. Skirt 11 is cut away at 63 to permit displacement of key 61 to the outside position delineated in broken line representation under the conditions hereinafter described.

Shear pin 60 is assembled in bushings 32 and 50 with a close slip fit and the opposed faces of the bushings are finished with sharp corners and hardened to a Rockwell C hardness of 55–58, so that the bushings are adapted to sever the shear pin cleanly across the intervening clearance, which is adjusted to 0.002–0.003″ upon installation of the shear pin. Shear pin 60 is retained in place by merely bending over the two ends as shown in Fig. 1, the upper bend being preferably disposed at the upper side of bushing 32.

In operation, the direction of coupling rotation is clockwise, as seen in Fig. 3. Power is transmitted smoothly from power input member 10 through shear pin 60 to power output member 12 and output shaft 39 until some restriction is applied to shaft 39, such as that due to a seizure or other stoppage in the power transmission in train with the coupling. At this point, member 12 decelerates rapidly, shearing pin 60 by the scissors-like relative shift of bushings 32 and 50, whereupon member 12 is free to decelerate while member 10, of which skirt 11 is part, continues to rotate at the unimpeded velocity of the drive source. Under these circumstances, there is relative motion between the coupling members and key 61 moves out from under bushing holder 52, permitting bushing holder 52 to rotate around the axis of bolt 55, thereby dropping shear pin bushing 50 to a position limited by shoulder 62 of member 12. Under continued relative motion between the coupling members surface 57 of member 12 strikes the free end of key 61, pivoting the key to the outer position shown in broken line representation in Fig. 3. The key is thus removed as an interference to any succeeding revolution of driving member 10 and its skirt 11. With shear pin bushing 50 in dropped position, the severed ends of shear pin 60 are separated by a relatively great clearance, thereby precluding jamming of the ends which can perpetuate power transmission even though the shear pin is, in fact, broken. An incidental advantage of the invention is the fact that the lower end of severed shear pin 60 is easily removed and, in the usual case, actually drops out under the force of gravity without human intervention. It should be mentioned that, although there is a centrifugal moment tending to pivot key 61 outwardly as seen in Fig. 3, the key is retained in position by disposing dog 62 behind shear pin 60 in the original fit up, so that pin 60 prevents movement of key 61 radially outwards.

After the cause for the power stoppage has been corrected, a new shear pin 60 is easily inserted, and this can be done by rotating member 12 relative to member 10 so that the region where key 61 is in normal position, i. e., within ring 34, is approached from the pivot side of holder 52. Under these circumstances, there is sufficient clearance to restore key 61 to inside position as shown in Fig. 3 by finger pressure, after which slight continued rotation of member 12 with respect to member 10 raises bushing holder 52 and bushing 50 to the preset level with respect to upper bushing 32. With the bushings in alignment, a new shear pin 60 is slipped into place and locked in position by bending over the ends as previously described, whereupon the transmission is again in condition for service.

The foregoing description is particularly concerned with a shear pin construction utilizing gravitational force to separate the severed pin ends; however, it will be understood that the orientation of the coupling need not be in any particular plane, provided that the movable bushing holder is biased in a direction effecting separation of the ends upon the imposition of an unusual load. Such a construction is shown for the embodiment of Figs. 6 and 7, elements corresponding to those of the embodiment of Figs. 1–5 being designated by the same reference numerals but with prime superscripts.

Referring to Figs. 6 and 7, the design of coupling members 10′, with its skirt 11′, and 12′ is in all respects similar to the design of 10, 11 and 12, except that the inside periphery of 11′ is machined to provide a circumferential slot 66 with surface 67 opposite the shear pin disposed slightly past bushing holder 68 in the direction of power output shaft 39′. Driven member 12′ is machined axially along surface 57′, providing a shelf 69 upon which bushing holder 68 is mounted for pivotal movement in a horizontal plane by pin 70. Shelf 69 is undercut as indicated at 74 to facilitate withdrawal of the broken end of shear pin 60′ which, in this embodiment, is not bent horizontally at the driven member end, so that it cannot hang up and continue to transfer driving power after shear pin severance. Bushing holder 68 is biased in a direction normal to surface 57′ by compression spring 75 seated in blind hole 76 drilled in power output member 12′. It will be understood that bushing holder 68 is retained in place against outward movement under the urging of spring 75 by the intact shear pin itself, which is thus placed under a slight preload, which in some uses is a desirable situation.

The operation of the embodiment of Figs. 6 and 7 is similar to that of the embodiment of Figs. 1–5, in that stoppage of driven member 12′ instantly severs shear pin 60′ at the interface of bushings 32′ and 50′, whereupon spring 75 pivots bushing holder 68 outwardly so that bushing 50′ with the severed end of 60′ is immediately displaced out of prolongation with the upper part of the shear pin and there can be no transmission of power across the broken ends. Usually the broken end of the shear pin drops out of the coupling through undercut 74 but, even if it remains temporarily in place within bushing 50′, the construction described prevents jamming between the coupling members in a manner tending to continue the transmission of power where discontinuance is instead desired.

From the foregoing it will be understood that this invention provides an improved shear pin assembly which safeguards against undesired power transmission in the event of an emergency, and that the invention is subject to relatively wide modification without departure from its essential spirit, for which reason it is intended to be limited only by the terms of the claims.

What is claimed is:

1. In a rotary coupling having a power input member and a power output member the combination comprising a pair of bushings with faces opposed in close clearance, one of said bushings being fixedly mounted on said power input member and the other of said bushings being pivotally mounted upon said power output member, a straight shear pin disposed within said bushings, said shear pin constituting the sole connection between said power input member and said power output member, and means operative upon severance of said shear pin for the separation of said bushings one from another.

2. In a rotary coupling having a power input member and a power output member the combination comprising a pair of bushings with faces opposed in close clearance, the first of said bushings being fixedly mounted on said power input member and the second of said bushings being pivotally mounted in a vertical plane upon said power output member, a straight shear pin disposed within said bushings, said shear pin constituting the sole connection between said power input member and said power output member, and key means mounted on said power input member in a position supporting said second of said bushings when said shear pin is intact and displaceable out of said position supporting said second of said bushings upon severance of said shear pin.

3. In a rotary coupling having a power input member and a power output member the combination comprising a pair of bushings with faces opposed in close clearance, the first of said bushings being fixedly mounted on said power input member and the second of said bushings being pivotally mounted in a horizontal plane upon said power output member, a straight shear pin disposed within said bushings, said shear pin constituting the sole connection between said power input member and said power output member, and spring means mounted on said power output member biasing said second of said bushings out of alignment with said first of said bushings for the separation of said bushings one from another upon severance of said shear pin.

References Cited in the file of this patent

UNITED STATES PATENTS

| | | |
|---|---|---|
| 1,493,188 | Campbell | May 6, 1924 |
| 2,384,188 | Mercier | Sept. 4, 1945 |
| 2,748,578 | Potts | June 5, 1956 |